United States Patent
Zou et al.

(10) Patent No.: US 9,266,261 B2
(45) Date of Patent: Feb. 23, 2016

(54) FLEXIBLE, IRIDESCENT NANOCRYSTALLINE CELLULOSE FILM, AND METHOD FOR PREPARATION

(75) Inventors: Xuejun Zou, Kirkland (CA); Xuequan Tan, Pointe-Claire (CA); Richard Berry, Notre-Dame-de-L'Ile Perrot (CA); Joseph Donat Louis Godbout, Montreal (CA)

(73) Assignee: FPINNOVATIONS, Pointe-Claire, QC (CA)

( * ) Notice: Subject to any disclaimer, the term of this patent is extended or adjusted under 35 U.S.C. 154(b) by 908 days.

(21) Appl. No.: 13/266,779

(22) PCT Filed: Apr. 23, 2010

(86) PCT No.: PCT/CA2010/000638
§ 371 (c)(1),
(2), (4) Date: Jun. 5, 2012

(87) PCT Pub. No.: WO2010/124378
PCT Pub. Date: Nov. 4, 2010

(65) Prior Publication Data
US 2012/0237750 A1    Sep. 20, 2012

Related U.S. Application Data

(60) Provisional application No. 61/213,054, filed on May 1, 2009.

(51) Int. Cl.
*B29D 7/00*       (2006.01)
*B29C 41/24*     (2006.01)
(Continued)

(52) U.S. Cl.
CPC . *B29C 41/24* (2013.01); *C08J 5/18* (2013.01); *C08L 1/02* (2013.01); *B29K 2001/00* (2013.01);
(Continued)

(58) Field of Classification Search
CPC ........... B29K 2029/08; B29K 2029/04; B29K 2105/162; B29K 2995/0018
USPC ............ 264/171.25, 217, 636, 650, 212, 299, 264/1.34
See application file for complete search history.

(56) References Cited

U.S. PATENT DOCUMENTS 5,629,055 A     5/1997  Revol et al.
2005/0266159 A1 * 12/2005 Lee et al. ...................... 427/162
(Continued)

FOREIGN PATENT DOCUMENTS

CN       101 172 164 A       5/2008

OTHER PUBLICATIONS

Ranby, B.G. Discuss. Faraday Soc. 1951, 11, 158-164.
(Continued)

*Primary Examiner* — Stella Yi
(74) *Attorney, Agent, or Firm* — Norton Rose Fulbright Canada LLP

(57) ABSTRACT

Flexible nanocrystalline cellulose films (NCC) include a polymer while retaining the property of tunable color. Polymers, for example PVOH and SB-latex, are effective in increasing the flexibility of the NCC films. The NCC film made with PVOH retains the iridescence better than that made with SB-latex; however, the NCC film made with SB-latex has a better tensile strength. In addition, the NCC film made with PVOH was found to disperse easily in water while the NCC film made with SB latex does not disperse in water (it is strongly water resistant). The color of NCC film made with PVOH and SB-latex can still be tuned with techniques that provide for tuning.

6 Claims, 14 Drawing Sheets

(51) Int. Cl.
*C08J 5/18* (2006.01)
*C08L 1/02* (2006.01)
*B29K 1/00* (2006.01)
*B29K 29/00* (2006.01)
*B29K 105/16* (2006.01)
*C08L 9/08* (2006.01)
*C08L 29/04* (2006.01)

(52) U.S. Cl.
CPC ....... *B29K 2029/04* (2013.01); *B29K 2105/162* (2013.01); *B29K 2995/0018* (2013.01); *C08J 2301/02* (2013.01); *C08L 9/08* (2013.01); *C08L 29/04* (2013.01); *Y10T 428/249921* (2015.04)

(56) References Cited

U.S. PATENT DOCUMENTS

2010/0069535 A1* 3/2010 Suzuki et al. .................. 524/37
2010/0279019 A1 11/2010 Beck et al.

OTHER PUBLICATIONS

Marchessault, R.H.; Morehead, F.F.; Walter, N.M. Nature 1959, 184, 632-633.
Revol, J.-F.; Bradford, H.; Giasson, J.; Marchessault, R.H.; Gray, D.G. Int. J. Biol. Macromol. 1992, 14, 170-172.
Hamad, W., "On the development and applications of cellulose nanofibrillar and nanocrystalline materials", Canadian J. of Chemical Engineering 84(5): 513-519 (2008).
Fukuzumi H et al: Transparent and High Gas Barrier Films of Cellulose Nanofibers Prepared by TEMPO-Mediated Oxidation, Biomacromolecules. American Chemical Asociety, US, vol. 10, Jan. 2009, pp. 162-165.
Revol J-F et al: Solid Self-Assembled Films of Cellulose with Chiral Nematic Order and Optically Variable Properties, Journal of Pulp and Paper Science, vol. 24, Jan. 1, 1998, pp. 146-149.
CN 101 172 164 A (Chinese Acad Sci Inst) (May 7, 2008) English language translation.
Supplementary European Search Report, EP 10 76 9183, Jun. 26, 2015.

* cited by examiner

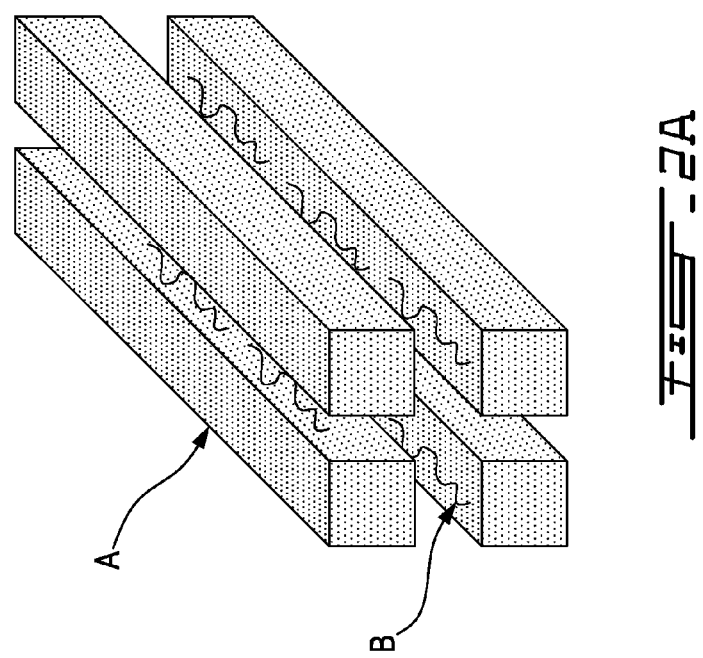
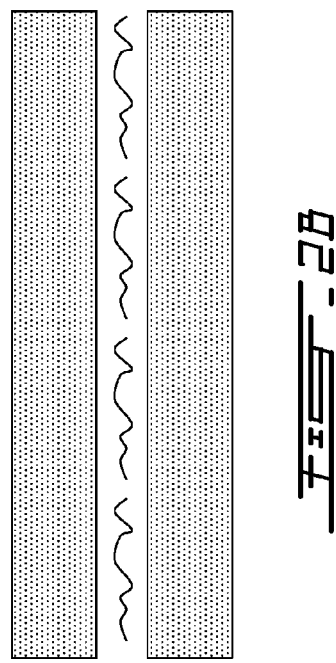

FLEXIBLE, IRIDESCENT NANOCRYSTALLINE CELLULOSE FILM, AND METHOD FOR PREPARATION

CROSS-REFERENCE TO RELATED APPLICATIONS

This application is a National entry of PCT/CA2010/000638 filed Apr. 23, 2010, in which the United States of America was designated and elected, and which remains pending in the International phase until Nov. 1, 2011, which application in turn claims priority under 35 USC 119(e) from U.S. Provisional Application Ser. No. 61/213,054, filed May 1, 2009.

TECHNICAL FIELD

The present invention relates to flexible solid films of nanocrystalline cellulose (NCC) particles produced by sulphuric acid hydrolysis of cellulose, and methods for their production; in particular inclusion of a polymer in the film permits control of the flexibility and dispersibility of the film.

BACKGROUND ART

The first cellulose crystalline particles were obtained through acid hydrolysis by Rånby et al. [1]. Later it was found that aqueous suspension of cellulose nanocrystalline particles can form a stable cholesteric (chiral nematic) liquid crystalline phase [2, 3]. The NCC particles are rod-like and of nanometer dimensions. In a dilute suspension, these nanocrystalline particles are randomly oriented. When the concentration of suspension is increased, it was believed that the cholesteric (chiral nematic) nanocrystals were formed and nanocrystals were helicoidally arranged, as shown in FIG. 1. Cholesteric liquid crystals display extremely high optical rotary power and reflect left hand of circularly polarized light. The reflected circularly polarized light wavelength $\lambda=nP$, where n is the mean refractive index of the chiral nematic phase, and P is the pitch of the chiral nematic structure. The wavelength of reflected light changes with the viewing angle, and iridescence is observed.

These cellulose nanocrystalline rods have unique physical properties such as high aspect ratio (10×200 nm), large surface area, and high tensile strength [5]. The shape and the nanometer-sized width of NCC rods allow a relatively flat film to be formed from the suspension by casting the suspension on an appropriate surface.

When water is evaporated the chiral nematic structure is preserved. Revol et al. [4] created a solidified liquid crystal film having advantageous optical characteristics. They adjusted the reflected visible light by adding different quantities of electrolyte such as NaCl or KCl. The formed solid films were anticipated to be supported on or embedded in a substrate. For example, small discs of the film may be embedded in security paper based on the optical properties. In their work, they stated that the cellulose nanocrystals were ideally suitable for an optical authenticating device. The film made as described in this patent was very brittle, without much flexibility. Beck et al. [6] discovered a method to control the iridescence colour of solid nanocrystalline cellulose (NCC) films by ultrasound or high-pressure shear (mechanical) energy input to the NCC suspension prior to film formation [6]. As the energy input to the NCC suspension increases, the colour of the resulting film shifts from the ultraviolet region towards the infrared region of the electromagnetic spectrum. This wavelength shift lies in the opposite direction to that caused by the addition of electrolytes to NCC suspensions prior to film formation. No additives are required to achieve the changes in colour. Colour changes can also be created by mixing two suspensions of differing sonication levels.

Beck et al. [6] also found that the iridescent colour of solid NCC films can be changed by controlling the pH and ionic strength of the NCC suspension. When the acid-form NCC (H-NCC) films are placed in sodium hydroxide solutions, their colour shifts towards longer wavelengths. This colour shift is partially reversed by re-placing the film in water. Although sodium-form NCC (Na-NCC) films can readily disperse in water, Na-NCC films do not disperse when placed in hydrochloric acid and sodium chloride, as well as sodium hydroxide solutions, of sufficient ionic strength; their iridescence also shifts toward longer wavelengths.

The above work focused exclusively on the manipulation and control of the optical properties of the NCC solid films. However, the solid films made with 100% NCC, as made and described in previous literature or patents, are very brittle and present handling difficulties, thereby reducing their suitability in many commercial applications. Prior to the present invention, there has been no method to produce flexible NCC film or enhance its flexibility.

DISCLOSURE OF THE INVENTION

This invention seeks to provide a flexible, iridescent nanocrystalline cellulose film.

In particular this invention seeks to provide a flexible, iridescent nanocrystalline cellulose film in which the colour is tunable.

This invention also seeks to provide a method of producing a flexible, iridescent nanocrystalline cellulose films as aforesaid.

In one aspect of the invention there is provided a flexible, iridescent nanocrystalline cellulose film comprising nanocrystalline cellulose particles in an aligned structure, interspaced by a polymer effective to form flexible bridges between particles without disturbing said aligned structure.

In another aspect of the invention there is provided a method of making a flexible, iridescent nanocrystalline cellulose film comprising: forming a suspension of nanocrystalline cellulose particles and a polymer in an aqueous vehicle, casting a wet film of said suspension on a substrate, and drying said wet film as a solid film.

DESCRIPTION OF THE DRAWINGS

FIGS. 2A and 2B illustrate schematically in perspective and side views, the role of PVOH in NCC matrix (PVOH functions as "lubricant" and as plasticizer in NCC film so the addition of PVOH helps achieve good flexibility while maintaining iridescence); the NCC particles (A) are rod-like particles of dimensions 10×10×200 nm; PVOH (B) is a water soluble, hydrophilic polymer;

DETAILED DESCRIPTION OF THE INVENTION

Figure 1:
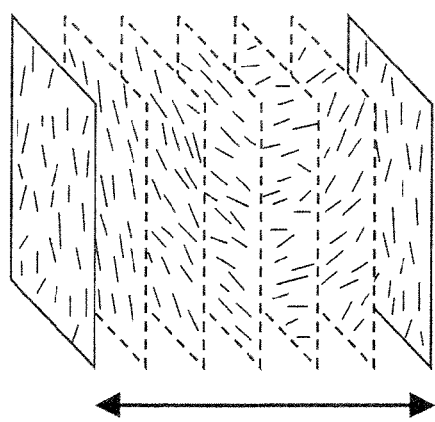
FIG. 1 illustrates schematically helicoidal orientation in typical chiral nematic liquid crystal.

The pioneering work of Revol et al. [4] has lead to the development of chiral nematic films from NCC which are iridescent and can be made in a wide range of colours. These optical properties have created significant interest in using these materials in many applications including security papers, decoration, cosmetics, etc. However, the iridescent films prepared from pure NCC are small in size and very brittle, making them unsuitable in commercial applications.

This is addressed in the present invention which provides a new method and procedure to make NCC film, with the objective of making the film strong and flexible while maintaining its unique colour properties.

The brittleness of the solid film formed from pure NCC suspension is caused by the strong hydrogen bonding between NCC rod particles. In the present invention the flexibility is increased by adding plasticizers which are usually low molecular polymers, more especially polymers having a Molecular Weight less than 10,000. Such polymers include hydrophilic, water soluble polymers such as polyvinyl alcohol (PVOH) and hydrophobic, water insoluble polymers such as styrene-butadiene (SB), styrene acrylate (SA), and polyvinyl acetate (PVAc). Polyvinyl alcohol (PVOH) and styrene-butadiene rubber (SBR) latex have been found to be particularly effective in improving the flexibility of NCC films.

Polymers having hydroxyl groups such as polyvinyl alcohol are especially advantageous. Other polymers having hydroxyl groups include partially hydrolysed polyvinyl esters such as polyvinyl acetate, starch and starch derivatives and cellulose esters having hydroxyl groups. Polymers with hydroxyl groups are advantageous because the hydroxyl groups have affinity for the NCC crystal surfaces and may hydrogen bond to the crystal surfaces.

Suitably the film may contain up to 25%, by weight, of polymer, based on the weight of the film. Herein percentages are by weight unless otherwise indicated.

The polymers function as a plasticizer or lubricant between the NCC particles, which counters the brittleness resulting from the strong hydrogen bonding between the NCC rod-like particles.

In particular, the polymers form flexible bridges between the NCC rod-like particles, without any substantial disruption of the aligned structure of the NCC rod-like particles necessary for the iridescence.

Another problem in making an NCC film is that it tends to strongly adhere to the substrate such as plexiglass dish or a polystyrene petri-dish, so the dried NCC film cannot be easily peeled from the substrate. This indicates a surface compatibility issue between dry NCC films and substrates. This problem was solved by spraying silicon on the substrate surface to reduce adhesion between the dry film and the substrate.

The present invention concerns the production of large-sized flexible and iridescent NCC film. The method is based on the addition of polymers into a dilute NCC suspension and enhancement of the homogeneity by sonication. The NCC suspension was then cast in a large sized plexiglass or polystyrene petri dish. After evaporation under ambient conditions, a large, thin, flexible film was formed and was peeled from the dish.

The production of large-sized NCC films allowed for evaluating various film properties. Results showed that NCC film has interesting properties including iridescent colour, high gloss and smoothness, and good strength and flexibility. Significant differences in film properties were also observed when using the above two polymers. Adding PVOH not only made NCC films flexible, but also maintained the strong iridescent colour which can still be tuned with a change in pH or sonication of the NCC suspension. It is believed that PVOH is effective because it is compatible with NCC due to its hydroxyl groups. This may explain why the iridescence is well preserved. The best flexibility and optical properties of the NCC films are achieved at a 10-15% PVOH level. Adding SBR latex produced NCC film with a high tensile strength and good flexibility. However, the iridescent colour of the film is weaker than pure NCC film or NCC film produced with PVOH addition. The best tensile strength and optical properties of the NCC-SBR latex films were achieved at 15% SBR latex.

NCC-PVOH film was also found to be water sensitive and could be re-dispersed in water with the help of sonication. This is because PVOH is a soluble polymer. The reformed NCC film still shows flexibility and iridescence. On the other hand, the film made from NCC and SBR latex is water-resistant and non-dispersible in water. Based on this finding, NCC/PVOH film may be provided in film form to be re-dispersed while NCC-SBR latex film can be provided for direct uses such as security decoration, protection and barrier materials.

Thus a new method to prepare flexible nanocrystalline cellulose films (NCC) is provided, by adding polymers while retaining the property of tuneable colour in these films has been discovered. Although a range of binders were assessed, polyvinyl alcohol (PVOH) and styrene-butadiene (SB) latex were found to be the most effective with PVOH being the best. The NCC film made with PVOH retains the iridescence better than that made with SB-latex. However, the NCC film made with SB-latex has a better flexibility. In addition, the NCC film made with PVOH was found to disperse easily in water while NCC film made with SB latex does not disperse at all in water (it is strongly water resistant). The colour of NCC films made with PVOH and SB-latex can still be tuned with the change in pH and sonication.

PVOH was added to the NCC suspension with concentrations ranging from 0 to 25% (wt./wt.). Adding 1% PVOH to NCC suspension formed a film but the film remained brittle and could be easily broken. At 3%, the film began to show flexibility and at 10% the film had high flexibility. SBR latex did not perform as well as PVOH as typically about 15% (wt./wt.) is needed to produce a flexible film. Using the optimum conditions identified, an iridescent, separated, flexible film with the dimension up to 1 m×0.5 m and a thickness of about 50 μm was successfully made.

Even with the addition of a polymer, adjusting the pH of the NCC suspension before film formation altered the colour of the film and the iridescent color of films was visible for all concentrations of PVOH. For example, when the pH of the mixed suspension was adjusted to 3.0, the reflected light of the film was in the yellow to red region of the spectrum. When the pH of the mixed suspension was adjusted to 8.0, the reflected light of the film was in the blue region of the spectrum.

EXAMPLES

The present invention is illustrated by, but not limited to the following examples:

General Procedure A: Producing a Flexible NCC Film with PVOH

A known solid content of NCC suspension (3-6% (w/w)) and a known concentration of PVOH solution (6-10% (w/w)) are mixed in a glass beaker by a magnetic stirrer for 5 minutes. The mixture is then sonicated for 2 minutes. The pH value of the mixed suspension is measured by a pH meter. Silicon spray is used to wipe down a plexiglass or polystyrene petri dish. The sonicated mixture is poured into the dish. After the dish is covered by the mixture, the dish is placed on a horizontal surface in ambient conditions with a temperature of 23° C. and relative humidity of 50%. The NCC film containing PVOH becomes dry within 24 hours.

The flexibility of the resulting solid NCC/PVOH films is measured by tensile strength and bending stiffness. The tensile strength is measured with an Instron tensile test instrument (a destructive test), and the bending stiffness is measured by a tensile stiffness Index (TSI) tester (a non-destructive test). The optical properties of NCC/PVOH films are characterized by measuring iridescence, opacity, and gloss. The iridescence of the film is tested with a goniospectrophotometer to obtain the dominant wavelengths of reflection at 45° incident illumination with D65 illuminating. The opacity of the solid film is measured with a Technibrite Micro TB-1C instrument, and the gloss is tested with a gloss meter (HunterLab D48-7).

General Procedure B: Producing a Flexible NCC Film with SBR Latex

A known concentration of SBR latex suspension (40-50% (w/w)) and a known concentration of the NCC solution (6-10% (w/w)) are mixed in a glass beaker by a magnetic stirrer for 5 minutes. The mixture is then sonicated for 2 minutes. The pH value of the mixed suspension is measured by a pH meter. Silicon spray is used to wipe down a plexiglass or polystyrene petri dish. The sonicated mixture is poured into the dish. After the dish is covered by the mixture, the dish was placed on a horizontal surface in ambient conditions with a temperature of 23° C. and relative humidity of 50%. The NCC film containing PVOH becomes dry within 24 hours.

The flexibility and optical properties of resulting solid NCC/SBR latex films are characterized as described in General Procedure A.

Role of Polymers in Making NCC Film Flexible

Following the above procedure, an initial screening assessment was carried out. PVOH and SBR latex were the most effective polymers in imparting flexibility on NCC film. A certain amount of polymer is needed to reach the maximum amount of flexibility. The NCC film made with PVOH retained the iridescence better than that made with SBR latex. It is believed that PVOH is particularly effective because it compatible with NCC due to its hydroxyl groups. This may explain why the iridescence is well preserved. However, the NCC film made with SBR latex had a better tensile strength. In addition, the NCC film made with PVOH was found to disperse easily in water while NCC film made with SBR latex did not disperse in water (it is strongly water resistant). The colour of NCC film made with PVOH and SBR latex can still be tuned with the change in pH and sonication.

PVOH as a soluble polymer, functions as "lubricant" and binder between NCC rods. In a suspension state, PVOH would lie between NCC rods to prevent a too strong hydrogen bonding between NCC rods, as shown in FIG. 2. At the same time, because PVOH is a soluble polymer, it does not interfere with the alignment of the NCC rods during drying. Therefore, PVOH can help form a flexible film without affecting its iridescent colour.

Figure 3:
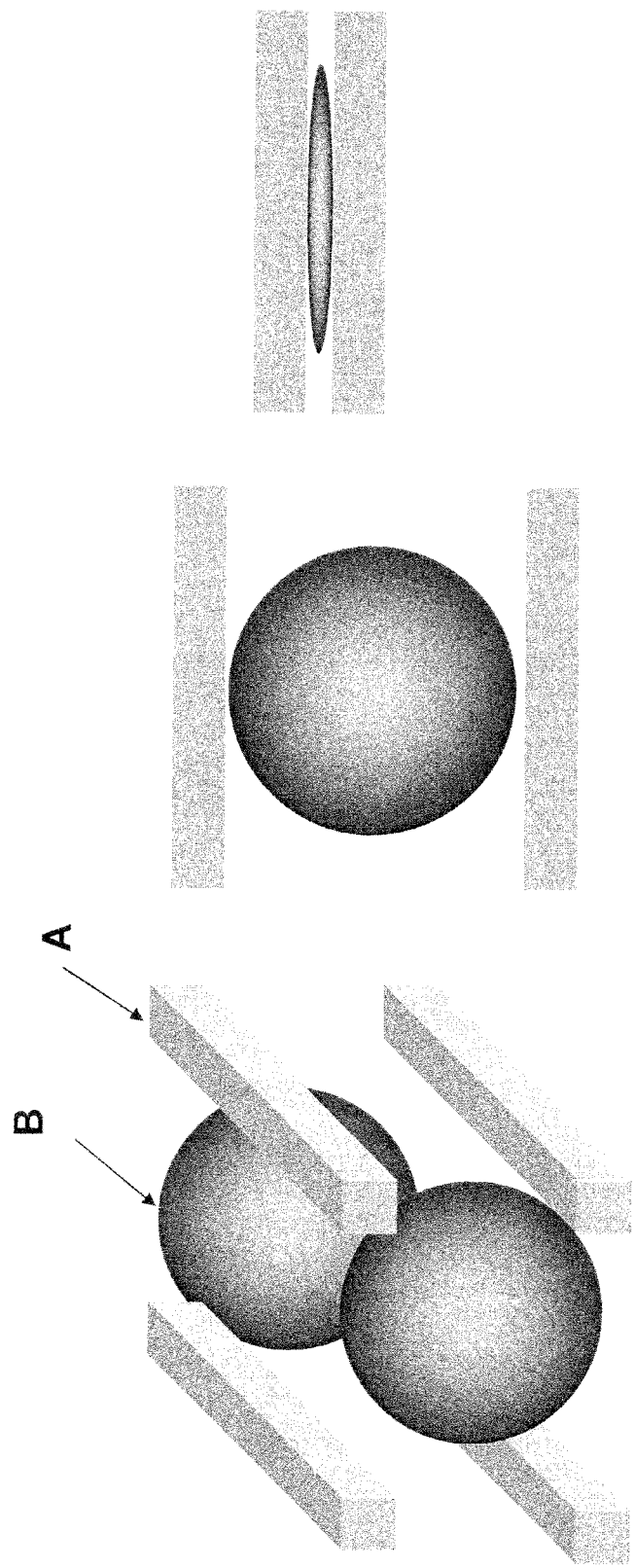
FIGS. 3A, 3B and 3C illustrate schematically in perspective, side and detail views, the role of SBR latex in NCC matrix (SBR latex functions as "glue" in NCC film so the addition of SBR latex helps achieve good strength and flexibility, but tends to reduce iridescence); the NCC particles (A) are rod-like particles of dimensions 10×10×200 nm; the SBR latex (B) comprises solid, hydrophobic, water insoluble sphere particles with a diameter of 100-300 nm; and the detailed view shows how the SBR latex particle melts in the film formation during drying.

The SBR latex is a sphere particle, with a diameter of 100-300 nm, comparable to the length of NCC. SBR latex particles well mixed with NCC rods in a suspension may separate NCC rods because of their large size. SBR latex particles, usually with a glass transition (Tg) point, form a film during drying, as shown in FIG. 3. Therefore, SBR latex particles function as "glue" between NCC rods, making the film strong and flexible. However, because of its large particle size, SBR latex tends to interfere with the alignment of NCC rods, thus reducing its iridescence.

Example 1

Producing a Large-Sized, Flexible and Iridescent NCC Film Containing 10% PVOH 31.76 g 8.84 (wt %) polyvinyl alcohol (PVOH) solution was added into 473.61 g 5.34% (wt.) nanocrystalline cellulose (NCC) suspension. Lower molecular weight (<10,000) PVOH (e.g. AIRVOL 203—trademark) was used. The NCC suspension and PVOH solution were mixed in a glass beaker by mechanical stirring for 5 min and then sonication for 2 min. The pH value of the mixture was 3.0. The mixture was poured into a plexiglass tray with the size of 0.48 m×0.78 m. The plexiglass tray was treated by silicon spray previously. The tray was placed on a horizontal table in ambient conditions with temperature of 23° C. and relative humidity of 50%. The film became dry within 48 hours. The grammage of the film was 75 g/m². The average of the film thickness was 50 μm.

Figure 4:
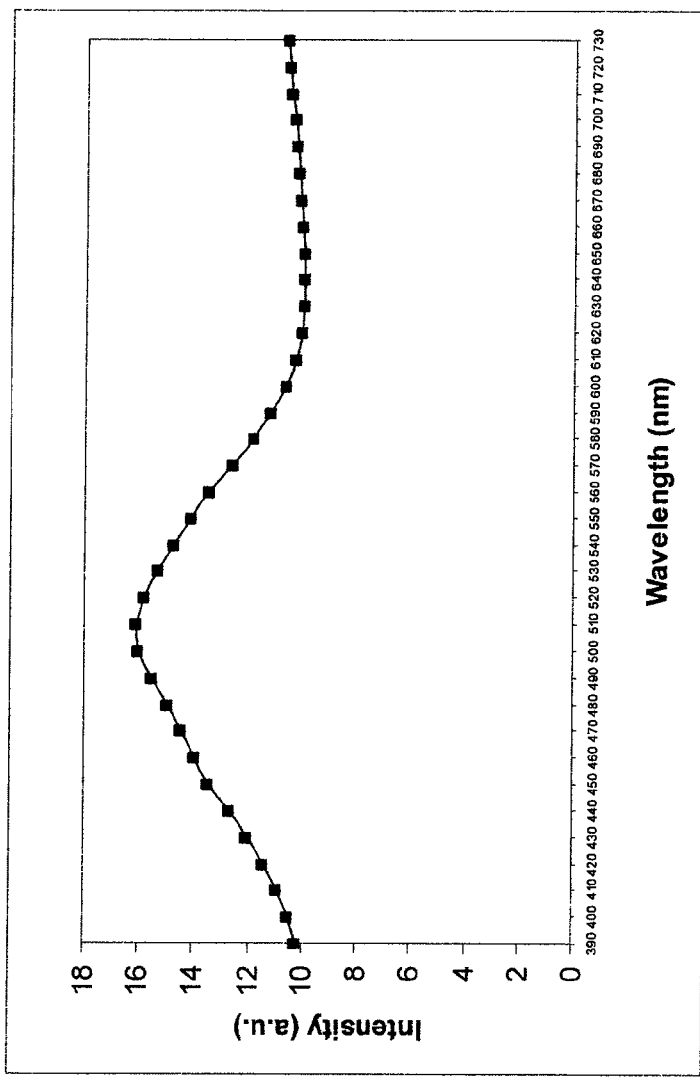
FIG. 4 is a plot showing the reflection spectra of NCC film containing 10% PVOH.

This large flexible NCC film containing 10% PVOH was produced. The film has tuneable optical properties. A goniospectrophotometer was used to identify the iridescent color properties. The reflective spectra of the film are shown in FIG. 4. The opacity of the film was 32.8%. The gloss was 69.7%. The Tensile Stiffness Index ($TSI_{max}$) was 93.35 kNm/g. The moisture content of the film was between 6-7% at room temperature. The film was water sensitive and was dispersible by sonication for 2 min.

Example 2

Producing a Large-Sized Flexible and Iridescent NCC Film Containing, 15% PVOH 9.69 g 8.84% (wt.) polyvinyl alcohol (PVOH) solution was added into 74.08 g 6.5% (wt) nanocrystalline cellulose (NCC) suspension. Lower molecular weight (<10,000)

PVOH (e.g. AIRVOL 203—trademark) was used. The NCC suspension and PVOH solution were mixed by mechanical stirring for 5 min and then sonication for 2 min. The pH value of the mixture was 3.0. The mixture was poured into a plexiglass tray with size of 0.32 m×0.24 m. The plexiglass tray was treated by silicon spray previously. The tray was placed on a horizontal table in ambient conditions with temperature of 23° C. and relative humidity of 50%. The film became dry within 24 hours. The grammage of the film was 75 g/m². The average of the film thickness was 50 μm.

Figure 5:
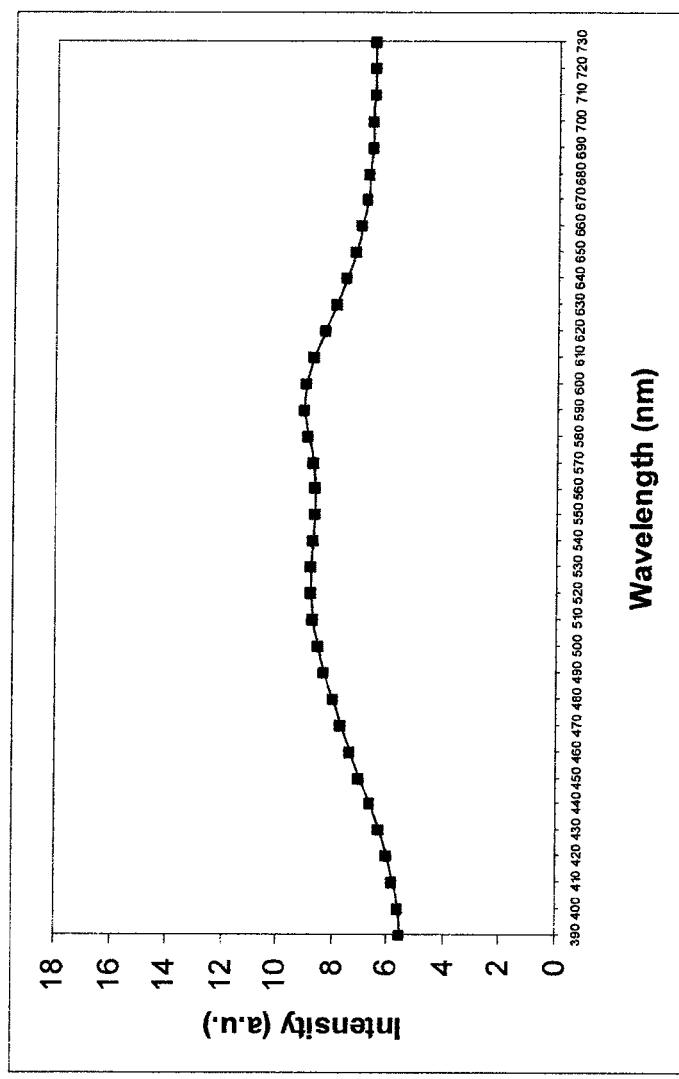
FIG. 5 is a plot showing the reflection spectra of NCC film containing 15% PVOH.

This large flexible NCC film containing 15% PVOH was produced. The film has tuneable optical properties. A goniospectrophotometer was used to identify the iridescent color properties. The reflective spectra are shown in FIG. 5. The gloss was 57.9%. The opacity of the film was 45.6%. The Tensile Stiffness Index ($TSI_{max}$) was 15.34 kNm/g. The moisture content of the film was between 6-7% at room temperature. The film was water sensitive and dispersible by sonication for 2 min.

Example 3

Effect of PVOH Content on the Flexibility of NCC-PVOH Films

Figure 6:
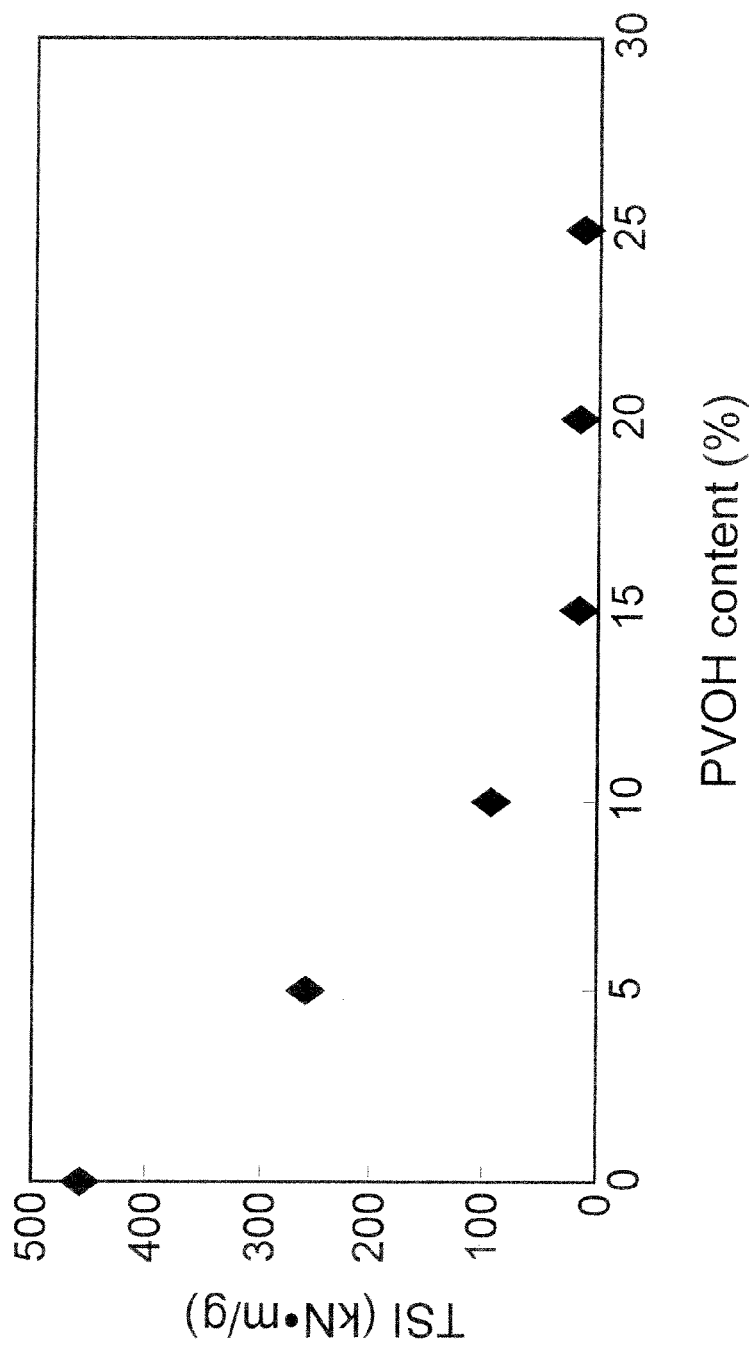
FIG. 6 is a plot showing effect of polymer content on the tensile stiffness index (TSI) of NCC film (TSI is an indication of film flexibility)
Figure 7:
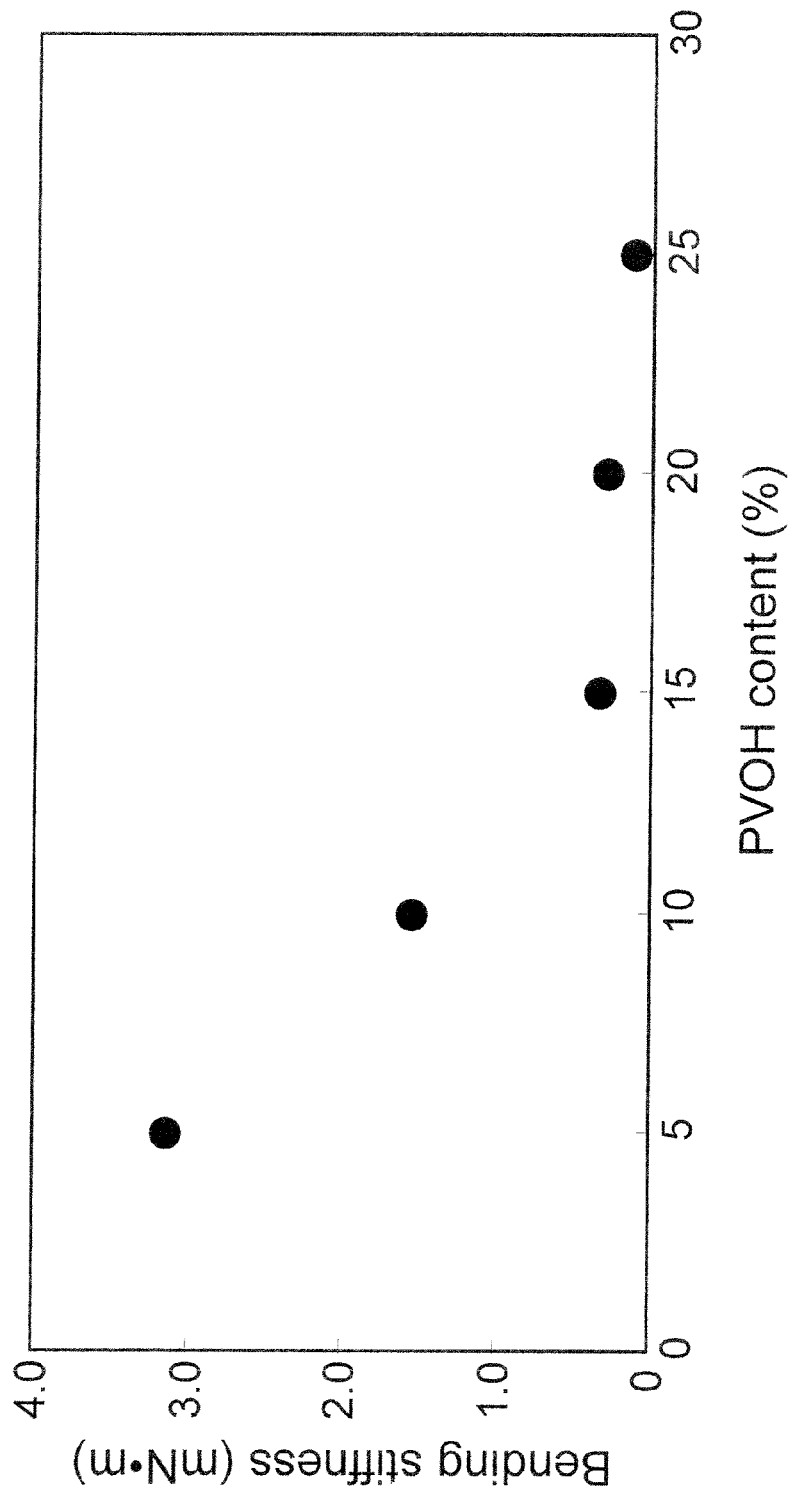
FIG. 7 is a plot showing the effect of PVOH polymer content on the bending stiffness of NCC film.

A group of NCC-PVOH films were prepared according to general procedure A. The PVOH content additions to NCC suspension increased from 0 to 25% (wt/wt) based on the NCC solids. The flexibility of the resulting solid NCC-PVOH films was measured by a tensile stiffness index (TSI) tester. Flexibility of NCC films was improved with increasing PVOH content (FIG. 6, 7). Lower tensile stiffness index (TSI) (KNm/g) and bending stiffness (mN·m) indicate better flexibility. The best flexibility with good iridescence was achieved when adding 10-15% PVOH.

Example 4

Effect of PVOH Content on Optical Properties of NCC-PVOH Films

Figure 8:
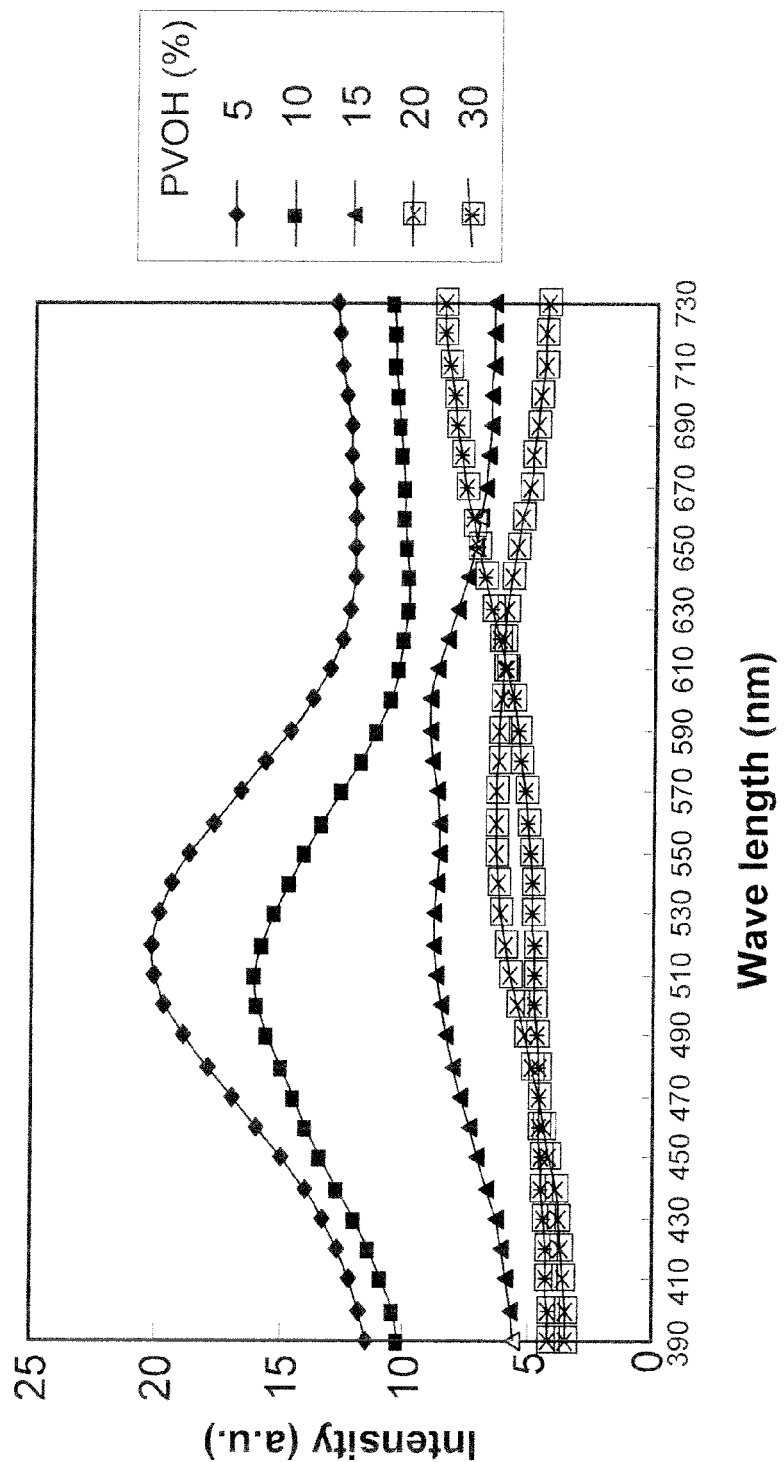
FIG. 8 is a plot showing the effect of PVOH content on color properties of NCC film (Reflection spectra)
Figure 9:
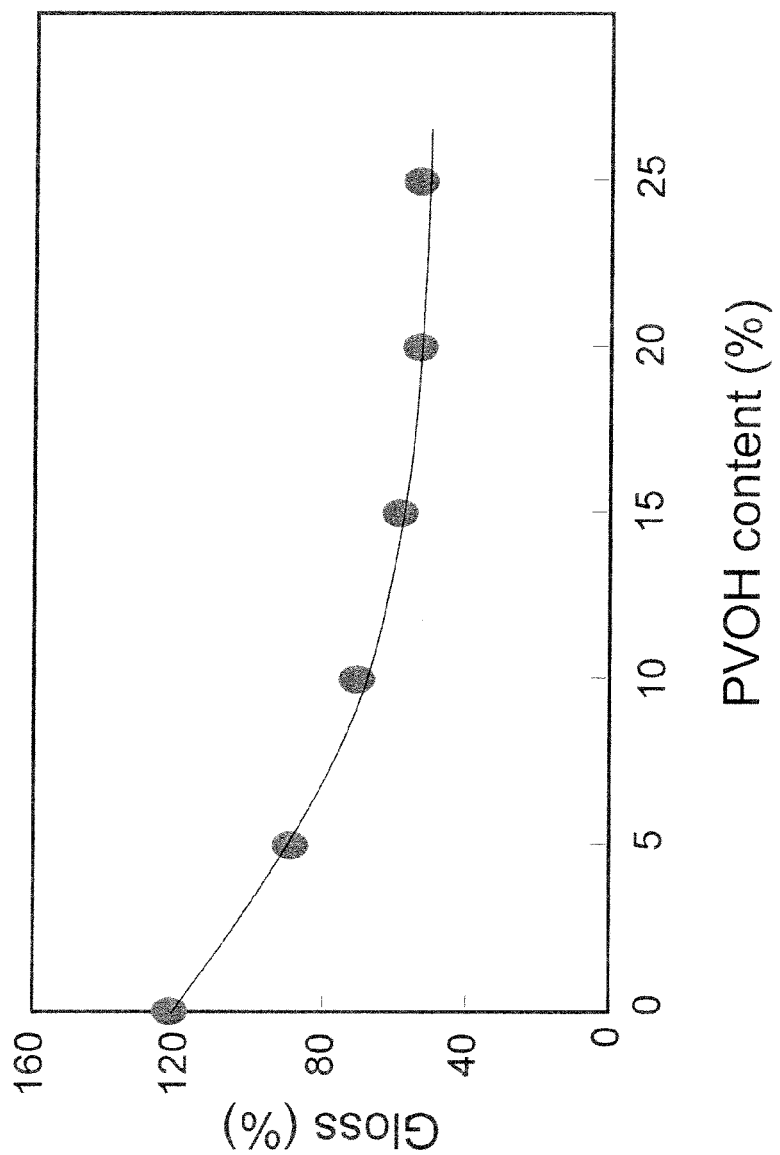
FIG. 9 is a plot showing the effect of PVOH content on gloss of NCC film.
Figure 10:
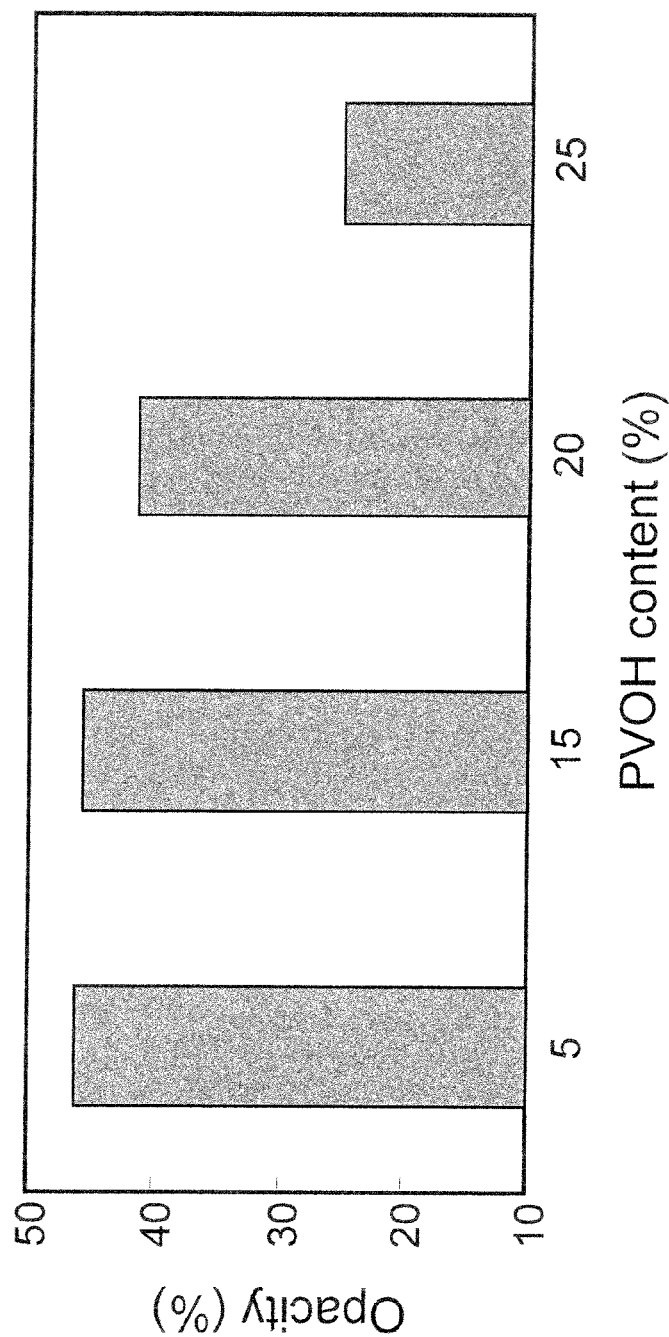
FIG. 10 shows the effect of PVOH content on opacity of NCC film.

A group of NCC-PVOH films were prepared according to general procedure A. The PVOH solution additions to NCC suspension increased from 0 to 25% (wt/wt) based on the NCC solids. The iridescence properties of NCC films were quantitatively characterized by goniospectrophotometry. Measurement results clearly showed that the optical properties of NCC-PVOH film were affected by PVOH content. Too much PVOH reduced the iridescence (FIG. 8). Optical properties of NCC/polymer films were also characterized by measuring the opacity and gloss. Pure NCC film has an extremely high gloss, but the gloss decreases with the addition of PVOH (FIG. 9). Another very interesting finding is that the NCC films can have different opacities depending on the strength of iridescence. This is because opacity is measured at a fixed wavelength of 570 nm (FIG. 10). These results suggest that both transparent and high opacity NCC film may be produced depending on the end-use requirements.

Example 5

Producing a Large-Sized, Flexible and Strong NCC Film Containing 10% SBR Latex 1.86 g 49.48% (wt) SBR latex was added into 129.52 g 6.41% (wt.) NCC suspension. The NCC suspension and SBR latex were mixed by mechanical stirring for 5 min and then sonication for 2 min. The pH value of the mixture was 3.0. The mixture was poured into a plexiglass tray with size of 0.30 m×0.41 m. The plexiglass tray was previously treated by a silicon spray. The tray was placed on a horizontal table in ambient conditions with temperature of 23° C. and relative humidity of 50%. The film became dry within 24 hours. The grammage of the film was 75 g/m². The average of the thickness was 50 μm.

Figure 11:
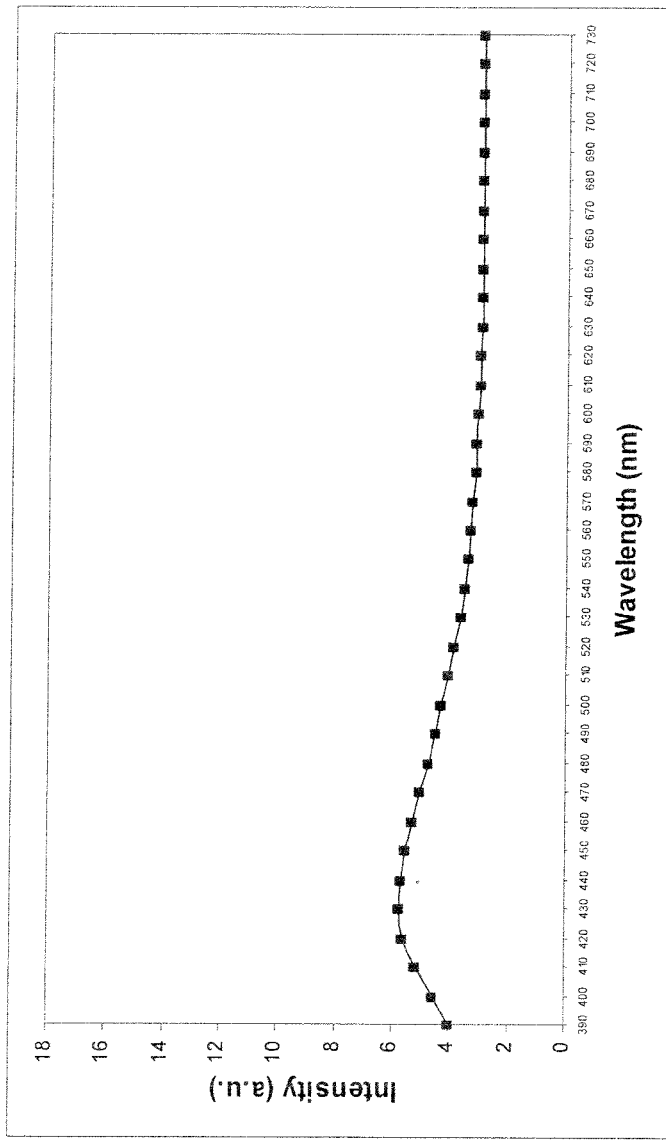
FIG. 11 is a plot showing the reflection spectra of NCC film containing 10% SBR latex.

A large flexible and strong NCC film containing 10% SBR latex was produced. The tensile stiffness index ($TSI_{max}$) of the film was 226.0 kNm/g. The reflective spectra of the film are shown in FIG. 11. %. The gloss was is 60.3%. The opacity was 23.3%. The moisture content of the film was between 6-7% at room temperature. The film was water resistance and maintained its integrity and iridescent colour after being soaked in water for 24 hours.

Example 6

Effect of SBR Latex Content on Tensile Strength of NCC-SBR Latex Films

Figure 12:
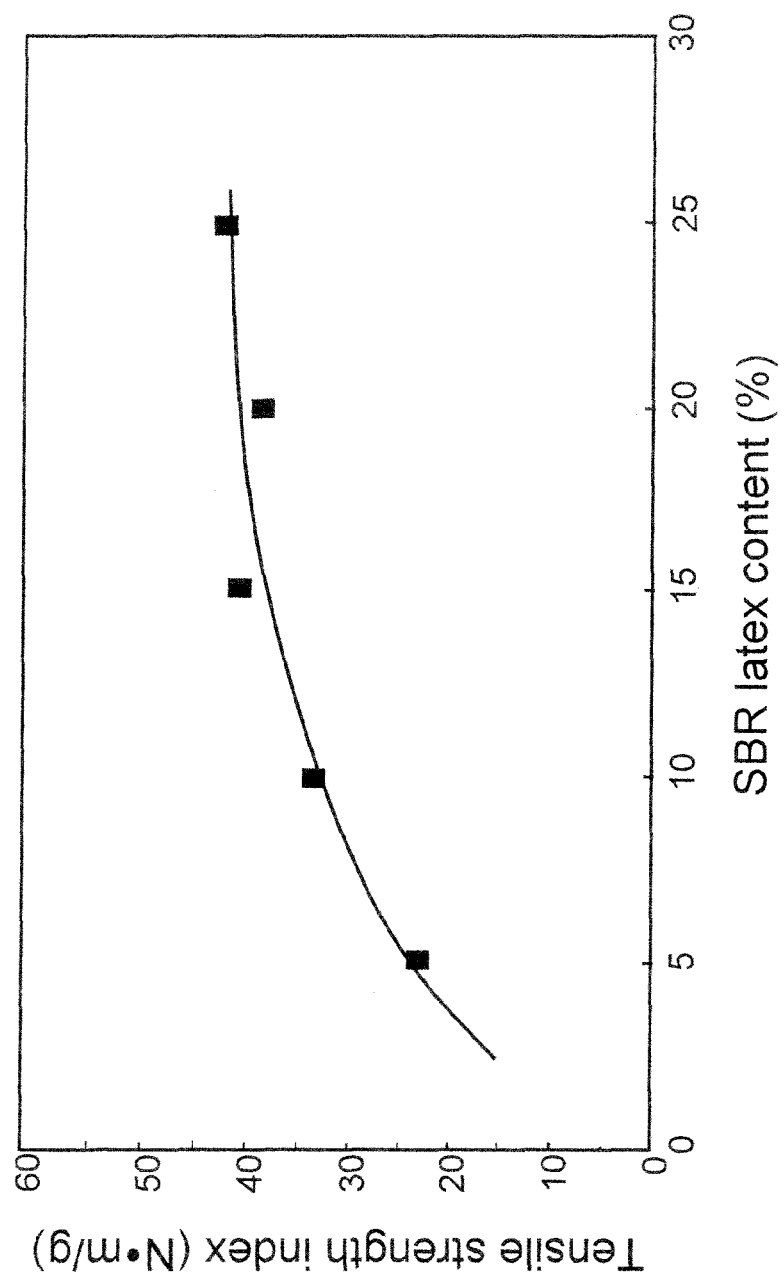
FIG. 12 is a plot showing the effect of SBR latex content on tensile strength of NCC

A group of NCC-polymer films were prepared according to general procedure B. The SBR latex suspension additions to the NCC suspension increased from 0 to 20% (wt/wt) based on the NCC solids. The tensile strength of the resulting solid NCC films was measured with an Instron tensile test instrument. The results showed that the highest tensile strength of NCC-SBR latex film occurred at 15% SBR latex addition (FIG. 12).

Example 7

Effect of Substrate Material on Tensile Strength of NCC-SBR Latex Films

Figure 13:
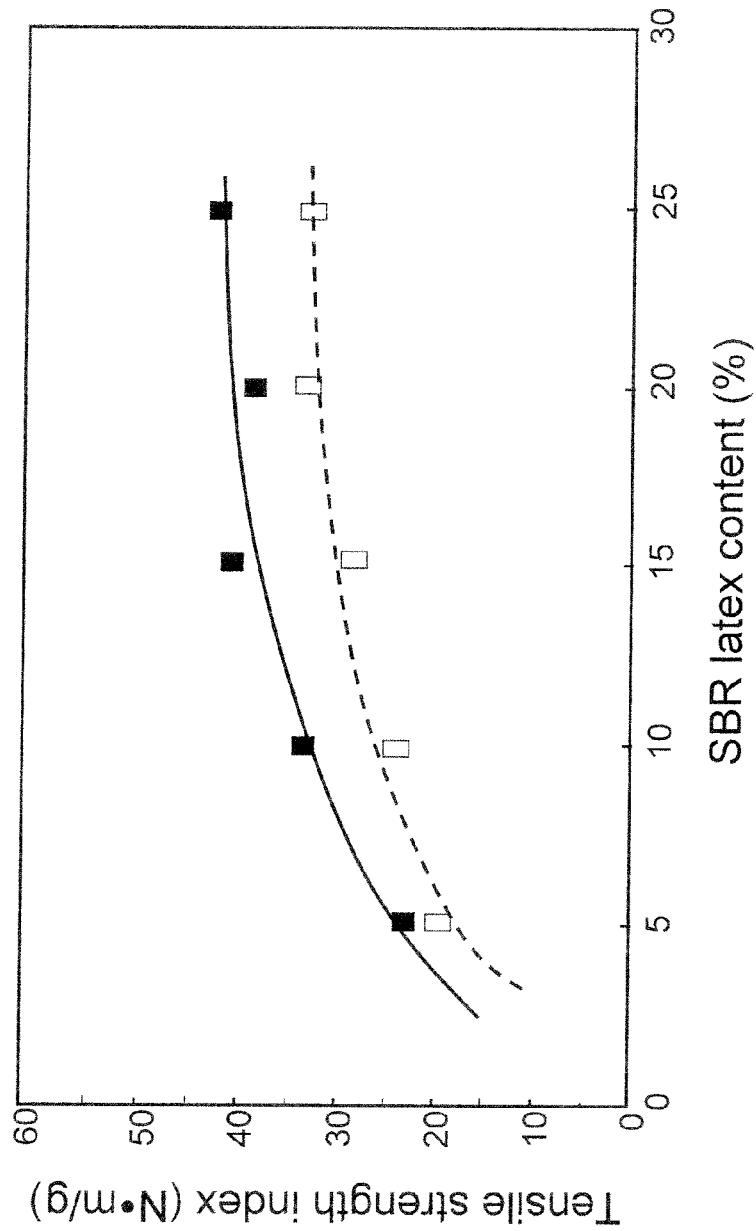
FIG. 13 is a plot showing the effect of substrate materials (plexiglass and polystyrene petri dishes) on tensile strength of NCC-SBR latex film.

Two groups of NCC-polymer films were prepared according to general procedure B. The SBR latex solution additions to NCC suspension increased from 0 to 20% (wt/wt) based on the NCC solids. One group of NCC-SBR latex films were cast on the plexiglass dish and the other group of NCC-SBR latex films were cast on the polystyrene petri dish. The tensile strength of the resulting solid NCC films was measured with an Instron tensile test instrument. The results showed that the substrate material affected the tensile strength of films. The film cast on the plexiglass showed higher tensile strength than that cast on the polystyrene petri dish (FIG. 13). The major reason probably is that the plexiglass dish has a smoother surface compared to the polystyrene dish and the NCC film cast on the plexiglass easily formed higher hydrogen bonds.

Example 8

Comparison of Iridescence of NCC-PVOH and NCC-SBR Latex Film

Figure 14:
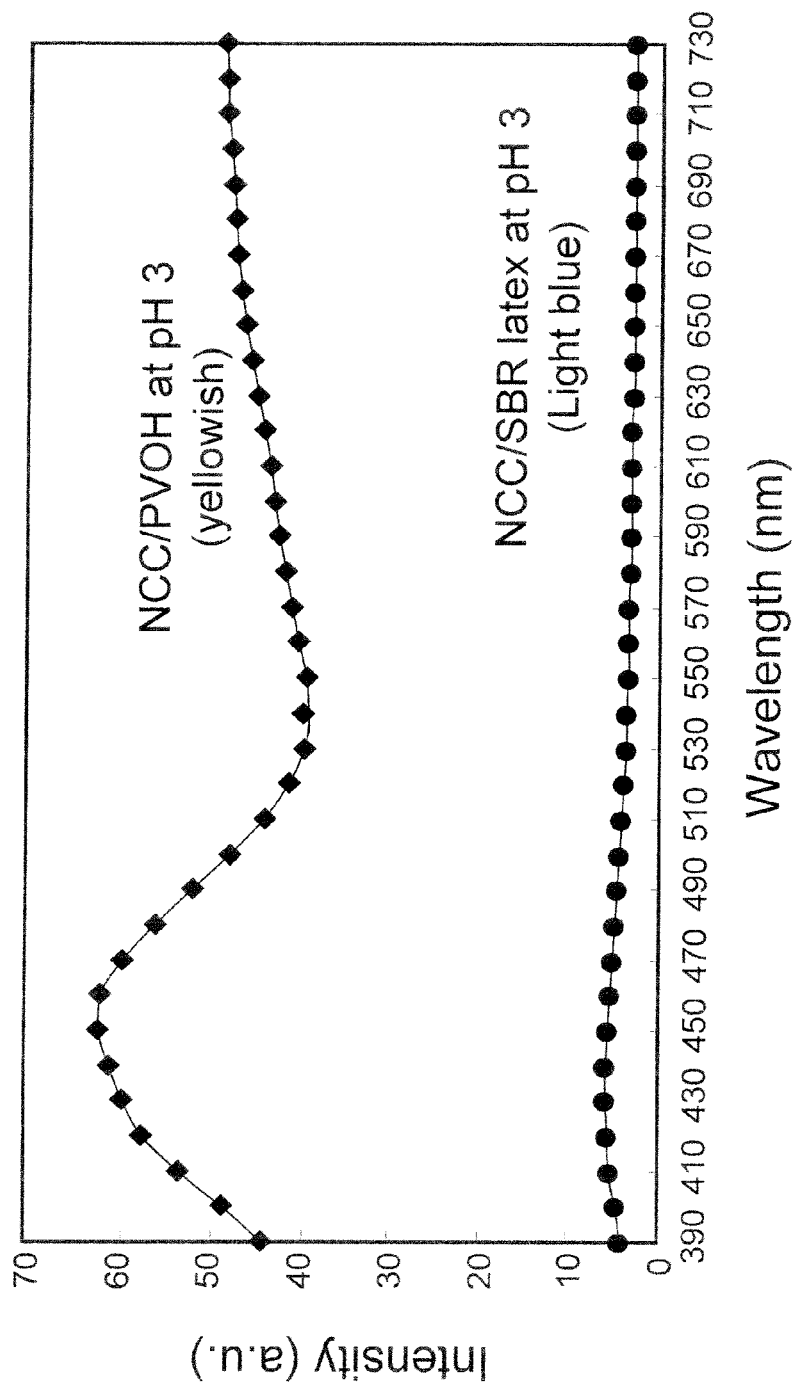
FIG. 14 is a plot showing the reflection spectra of NCC-PVOH film vs. NCC-SBR latex, both at pH 3.

Two NCC-polymer films were prepared according to general procedure A and B. The PVOH solution added to the NCC suspension was 10% (wt/wt) based on the NCC solids. The SBR latex suspension added to NCC suspension was 10% (wt/wt) based on the NCC solids. The thickness of the resulting NCC-PVOH and NCC-SBR latex films was about 40 μm. A goniospectrophotometer was used to quantify the iridescent color properties. The results showed that adding PVOH solution produced NCC film with a higher reflective intensity than adding equal amount of PVOH solution (FIG. 14). PVOH, a soluble polymer, does not interfere with the alignment of the NCC rods during drying, thus keeping the film iridescent. However, due to its large size (200-300 nm in diameter), SBR latex may disturb the alignment of the NCC rods and also create polymer "islands" between NCC aggregates, causing weakening of iridescence.

Example 9

Altering pH of NCC Suspension

Two NCC-PVOH films were prepared according to general procedure A. A chemical, $NH_3 \cdot H_2O$, was used to alter the pH of the NCC suspension. When the pH of the mixed suspension was 3.0, the reflected light of the film was in the yellow to red region of the spectrum. When the pH of the mixed suspension was 8.0, the reflected light of the film was in the blue region of the spectrum. Films were made with 20% PVOH at a pH of 3.0 and a pH of 8.0. This example demonstrates that adjusting the pH of the suspension before film formation altered the colour of the film.

REFERENCES

1. Rånby, B. G. *Discuss. Faraday Soc.* 1951, 11, 158-164.
2. Marchessault, R. H.; Morehead. F. F.; Walter, N. M. *Nature* 1959, 184, 632-633.
3. Revol, J.-F.; Bradford, H.; Giasson, J.; Marchessault, R. H.; Gray, D. G. It *Biol. Macromol.* 1992, 14, 170-172.
4. Revol, J.-F.; Godbout, L.; Gray, D. G. Solidified liquid crystals of cellulose with optically variable properties, U.S. Pat. No. 5,629,055; May 13, 1997, to Paprican.
5. Hamad, W., "On the development and applications of cellulose nanofibrillar and nanocrystalline materials", *Canadian J. of Chemical Engineering* 84(5): 513-519 (2008).
6. Beck S. et al., U.S. Patent Application No. 61/213,053, filed May 1, 2009.

The invention claimed is:

1. A method of making a flexible, iridescent nanocrystalline cellulose film comprising: forming a suspension of nanocrystalline cellulose particles and a polymer in an aqueous vehicle, casting a wet film of said suspension on a substrate treated to reduce adhesion between the substrate and a solid film to be formed from said wet film, drying said wet film as a solid film, and peeling said solid film from said substrate as a flexible, iridescent nanocrystalline cellulose film, wherein said polymer is a hydroxyl group containing polymer having a Molecular Weight less than 10,000.

2. The method of claim 1, wherein said casting forms said wet film with said nanocrystalline cellulose particles in an aligned structure, and said wet film is dried with said polymer interspacing said particles and forming flexible bridges between the nanocrystalline cellulose particles in the aligned structure.

3. The method of claim 1, wherein said polymer is polyvinyl alcohol.

4. The method of claim 2, wherein said polymer is polyvinyl alcohol.

5. A method of making a flexible, iridescent nanocrystalline cellulose film comprising: forming a suspension of nanocrystalline cellulose particles and a polymer in an aqueous vehicle, casting a wet film of said suspension on a substrate treated to reduce adhesion between the substrate and a solid film to be formed from said wet film, drying said wet film as a solid film, and peeling said solid film from said substrate as a flexible, iridescent nanocrystalline cellulose film, wherein said polymer is a hydroxyl group containing polymer having a Molecular Weight less than 10,000, wherein said casting forms said wet film with said nanocrystalline cellulose particles in an aligned structure, and said wet film is dried with said polymer interspacing said particles and forming flexible bridges between the nanocrystalline cellulose particles in the aligned structure, wherein said polymer is a hydroxyl group containing polymer having a Molecular Weight less than 10,000.

6. A method of making a flexible, iridescent nanocrystalline cellulose film comprising: forming a suspension of nanocrystalline cellulose particles and a polymer in an aqueous vehicle, casting a wet film of said suspension on a substrate treated to reduce adhesion between the substrate and a solid film to be formed from said wet film, drying said wet film as a solid film, and peeling said solid film from said substrate as a flexible, iridescent nanocrystalline cellulose film, wherein said polymer is a hydroxyl group containing polymer having a Molecular Weight less than 10,000, wherein said polymer is styrene-butadiene rubber latex.

* * * * *